United States Patent [19]

Gouvernelle

[11] Patent Number: 4,899,258
[45] Date of Patent: Feb. 6, 1990

[54] SOLID ELECTROLYTE CAPACITOR WITH INTEGRAL FUSE

[75] Inventor: Didier Gouvernelle, Semblancay, France

[73] Assignee: Sprague Electric Company, North Adams, Mass.

[21] Appl. No.: 324,131

[22] Filed: Mar. 16, 1989

[30] Foreign Application Priority Data

Jul. 4, 1988 [FR] France ................... 8809015

[51] Int. Cl.⁴ .............................................. H01G 9/06
[52] U.S. Cl. ..................................... 361/534; 29/25.03
[58] Field of Search ........................ 361/275, 532–534, 361/540; 29/570.1

[56] References Cited

U.S. PATENT DOCUMENTS

| 4,107,762 | 8/1978 | Shirn et al. | 361/534 |
| 4,224,656 | 9/1980 | DeMatos et al. | 361/534 |
| 4,514,468 | 4/1985 | Lucey | 428/458 |
| 4,539,623 | 9/1985 | Irikura et al. | 361/540 |
| 4,660,127 | 4/1987 | Gunter | 361/540 |
| 4,720,772 | 1/1988 | Yamane et al. | 361/534 |

FOREIGN PATENT DOCUMENTS

| 232868 | 8/1987 | European Pat. Off. . |
| 233751 | 8/1987 | European Pat. Off. . |
| 744480 | 2/1944 | Fed. Rep. of Germany . |

OTHER PUBLICATIONS

R. E. Horstmann & J. D. Pratt, "Current–Limited Chip Capacitor" *IBM Technical Disclosure Bulletin*, vol. 27, No. 4A, Sep. 1984, pp. 2026–2027.

Primary Examiner—Donald A. Griffin

[57] ABSTRACT

A solid electrolyte capacitor body is embedded in an electrically insulative block of resin. Output terminals each connected to a respective electrode of the capacitor body project from the block. One output terminal includes a first section fixed to one of the electrodes and a second section electrically insulated from the first section and the capacitor body. A fusible member alone establishes electrical connection between the first and second sections. The fusible member is embedded in a rigid thermally insulative resin which extends between the first and second sections to couple them together mechanically.

12 Claims, 2 Drawing Sheets

SOLID ELECTROLYTE CAPACITOR WITH INTEGRAL FUSE

BACKGROUND OF THE INVENTION

The invention concerns providing a fuse in a solid electrolyte capacitor such as a tantalum capacitor.

With the particular objective of reducing the deleterious consequences of a short-circuit in a circuit including one or more solid electrolyte capacitors, attempts have been made to incorporate a fuse into the capacitor while minimizing the resulting increase in overall dimensions.

A solid electrolyte capacitor, of the tantalum type in particular, principally comprises a porous anode from which projects an anode wire and which is covered partially or completely with various conventional layers of dielectric/oxide, manganese dioxide substantially filling the pores of the anode and constituting the solid elctrolyte, and a conductive layer forming the counter-electrode or cathode. This constitutes a capacitor body that is then surrounded with an electrically insulative material after fixing to the electrodes connecting leads ending in output terminals. Extremely compact capacitors of simple geometrical shape (cylinder or usually rectangular parallelepiped) are obtained this way.

Various capacitors of this type with integral fuse are known already.

For example, U.S. Pat. No. 4,107,762 describes a capacitor in which the lead forming the negative terminal is connected to the counter-electrode by a fuse embedded in the insulative coating, this fuse being formed by a twin tape of aluminum and palladium. In the event of a short-circuit the exothermic heating of this fuse results in the alloying of these elements and an electrical break between this negative terminal and the counter-electrode.

This solution, which is satisfactory in many cases, nevertheless has the disadvantage of relatively wide dispersion in the effective or useful length of these fuses and therefore in the associated current thresholds.

To alleviate this disadvantage it has subsequently been proposed in U.S. Pat. No. 4,224,656 to use a fusible block comprising a parallel sided insulative block through which extend a hole and a fusible wire parallel to the axis of the hole, the effective length of the wire therefore being determined in a very precise way.

The accuracy of this fusible block is improved in that this effective length of the fusible wire is in a thermally insulative air pocket which prevents the heat generated in the wire by the JOULE effect diffusing into the capacitor and slowing down the breaking of the circuit. The fabrication of such blocks is always relatively long and delicate.

To facilitate manufacture with a comparable level of performance U.S. Pat. No. 4,720,772 proposes a fusible member comprising an insulating plate on which two separate conductive layers of very precise geometry are connected by a fusible wire disposed at a determined location by virtue of which its effective length is precisely determined. This fusible wire is coated with a thermally insulative elastic material such as a silicone resin in which bubbles are formed for improved thermal insulation.

It will be noted that patents U.S. Pat. Nos. 4,224,656 and 4,720,772 achieve "calibration" of the effective length the fusible wire through the use of an additional support member apparently necessary during manufacture to maintain a predetermined distance between the areas in which the ends of the fusible wire must be fixed.

An object of the invention is to further simplify the integration of a fuse into a solid electrolyte capacitor and therefore to reduce the cost thereof, while ensuring a comparable level of performance, through eliminating any intermediate support member attached between the negative connecting lead and the counter-electrode.

To this end it proposes to place a predetermined effective length of calibrated fusible wire between two electrically insulated sections of this lead, which is directly connected by one of its sections to the counter-electrode.

SUMMARY OF THE INVENTION

In one aspect, the present invention consists in a solid electrolyte capacitor comprising an electrically insulative block of resin, a capacitor body embedded in said block having two electrodes, two connecting leads projecting from said block to provide output terminals each connected to a respective electrode, a fusible member of predetermined length connected in series between said capacitor body and a preselected output terminal, wherein the connecting lead providing said preselected output terminal includes a first section fixed to one of said electrodes and a second section electrically insulated from said first section and said capacitor body and projecting from said block to form said preselected output terminal and said fusible member alone establishes an electrical connection between said first and second sections and is embedded in a rigid, thermally insulative support mass of resin embedded in said block and extending between said first and second sections so as to couple them together mechanically.

In preferred embodiments said first and second sections comprise two parallel coplanar lugs connected by said fusible member;

each section has lateral flanks coplanar with those of the other section and said parallel lugs each flank one of said lateral flanks and are laterally offset relative to each other;

said coplanar lugs are perpendicular to portions of each section with which they form a cavity at least part of which is filled by said mass;

said fusible member is a wire of calibrated cross-section extending transversely between said lugs:

said mass is made from a resin that will not burn at the temperature at which said fusible member melts:

said mass is made from a resin polymerized using ultra-violet light:

said capacitor body comprises a porous tantalum core.

In another aspect, the present invention consists in a method of manufacturing a solid electrolyte capacitor incorporating a fusible member, in which method:

a capacitor body equipped with electrodes is made;

a plate is cut out to produce at least one discontinuous strip connected to a reference frame and including two end sections attached to said reference frame and a center section connected to said reference frame by a continuous joining strip;

the sections of said discontinuous strip are bent along transverse bending lines to their final shape;

before or after the aforementioned bending, a fusible member is fixed between said center section and one of said end sections and embedded in a rigid, thermally insulative support mass of resin extending between said sections so as to couple them together mechanically and form a first connecting lead;

said center section is separated from said continuous joining strip and it and the other end section forming a second connecting lead are fixed to respective electrodes of said capacitor body:

said capacitor body and said connecting leads are overmolded with electrically insulative resin; and said leads are separated from said reference frame.

Two identical continuous strips are preferably delimited by cutting in each reference frame and each comprises a center section connected to said reference frame by a common continuous joining strip.

Objects, characteristics and advantages of the invention will emerge from the following description given by way of non-limiting example only with reference to the appended diagramatic drawings.

DESCRIPTION OF THE PREFERRED EMBODIMENT

Figure 1:
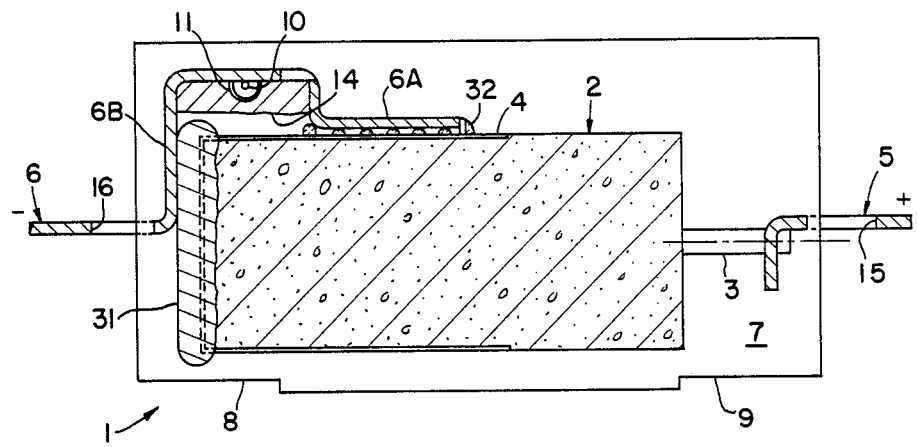
FIG. 1 is a schematic view in cross-section of a tantalum capacitor incorporating an integral fuse in accordance with the invention.

FIG. 1 shows a tantalum capacitor comprising a capacitor body 2 from which projects a tantalum anode rod 3.

The capacitor body 2 is of any appropriate known type with a porous core of surface-oxidized tantalum coated with a solid electrolyte formed of manganese dioxide and partially covered with various appropriate layers including an external counter-electrode layer 4 electrically insulated from the anode rod 3.

A positive conducting connecting lead 5 is fixed to the anode rod 3 (by means of a previously provided notch 5A) and a negative conducting connecting lead 6 is fixed to the counter-electrode layer 4.

The whole is coated with a rectangular parallelepiped block of insulative material 7, in practice an epoxy resin of any appropriate type, so that the conductive leads 5 and 6 project to form + and − output terminals. Recesses 8 and 9 are provided near opposite edges of the block 2 to enable the free ends of the leads 5 and 6 to be folded essentially within the overall dimensions of the block 7.

The conductive lead 6 is formed of two electrically insulated sections 6A and 6B and a calibrated fusible wire 10 has its ends fixed to each of these sections, by brazing, for example, forming brazed areas 11.

The fusible wire 10 is of any appropriate type, for example, a wire marketed under the trademark "PYROFUSE" by the company PYROFUSE CORPORATION. It may be an aluminum wire covered with a film of palladium or copper, or a lead-tin-silver wire or a lead-silver wire with appropriate known proportions.

The sections 6A and 6B comprise parallel lugs 12 and 13 between which is a space of predetermined constant width (see FIG. 3) which determines the effective length of the fusible wire 10.

The wire 10 is embedded in a protective resin 14 which adheres to the lugs 12 and 13, filling a cavity formed between parallel portions of the sections 6A and 6B.

This protection resin 14 has two functions:

1. Thermal protection of the insulative resin of the block 7 if the fusible wire melts due to an excessively high current; this enables precise definition of the melting characteristics (approximately 400° C. or even up to 660° C. depending on the nature of the materials from which the fusible wire is made). The protective resin 14 is preferably chosen that it will not burn at the temperature at which the fusible wire melts, so as not to introduce any residual resistance.

2. Mechanical bonding of the lugs 12 and 13 (see below) by virtue of its rigidity. The resin 14 therefore constitutes a support and bonding mass for the sections 6A and 6B.

The protective resin 14, which is rigid and thermally insulative and will not burn at the temperature at which the fusible wire 10 melts, may be a resin of the CHIPBONDER 360 or LID 1043 type, for example.

It may also be similar to the resin of the block 7. As it is formed before said block (see below) it produces in the finished capacitor 1 an interface which enables its existence to be detected.

Openings 15 and 16 are advantageously made in the leads 5 and 6 to improve the fixing of them into the block 7.

Figure 3:
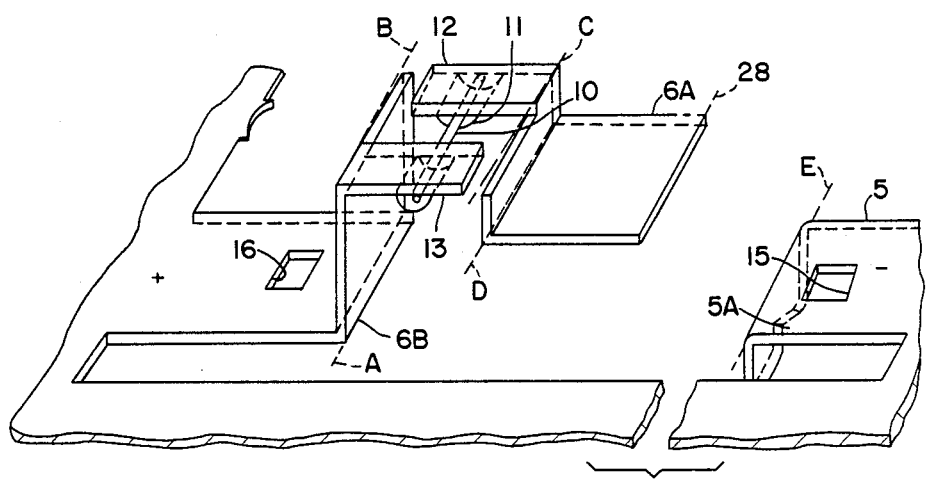
FIG. 3 is a partial view in perspective of the plate from FIG. 2 after operations of bending, fixing the fusible wire and stamping.
Figure 2:
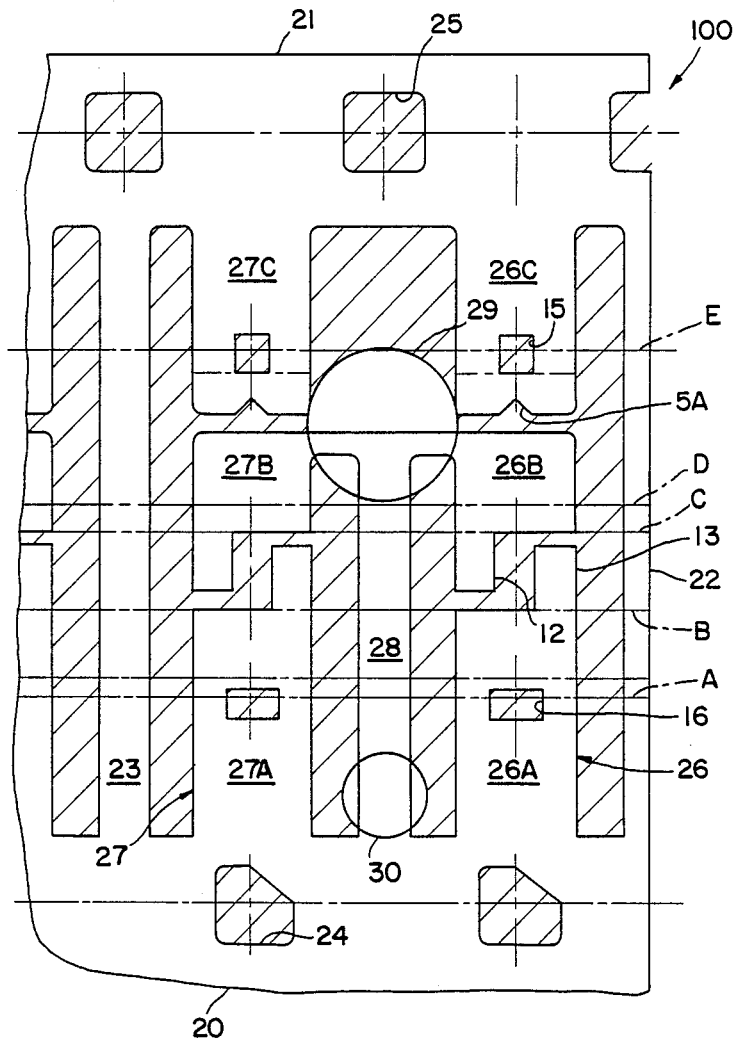
FIG. 2 is a partial top view of a plate from which the connecting leads of the FIG. 1 capacitor have been cut out.

FIGS. 2 and 3 show two successive stages in the manufacture of the capacitor 1, chosen to show the detail of forming the leads 5 and 6 and fixing the fusible wire 10.

FIG. 2 shows part of a plate 100 of electrically conductive material (for example FN 42 type iron-nickel alloy) in which various openings (widely spaced shaded areas) have been cut, by stamping, for example.

This "lead frame" comprises two vertical strips 20 and 21 attached to two horizontal strips 22 and 23 incorporating locating holes 24 and 25. This arrangement is reproduced identically at intervals along the length of the horizontal strips.

In the reference frame comprising the strips 20 through 23 are formed two discontinuous vertical strips 26 and 27 each comprising sections with coplanar flanks and destined to become the connecting leads 5 and 6 of the capacitor 1 from FIG. 1.

The strip 26 comrpises, starting from the horizontal strip 20, a section 26A destined to constitute the section 6B of the lead 6 in which is formed the hole 16 and terminated along one of its flanks by the lug 13 which in this instance has a width around one third of the strip 26.

The strip 26 then comprises a section 26B connected to a T-shape strip 28 to the horizontal strip 20 and destined to become the section 6A of the lead 6. The section 26B is prolonged on one of its flanks, spaced from the lug 13, by a lug corresponding to the lug 12 of the section 6A (here of the same width as the lug 13).

This strip 26 finally comprises a section 26C connected to the horizontal strip 21 destined to constitute the lug 5 of the capacitor 1 and in which are formed the hole 15 and the notch 5A of the section 5.

The strip 27 comprises similar sections 27A, 27B and 27C, the section 27B being connected to the horizontal strip 20 by said T-shape strip 28.

The dimensions of the T-shape strip 28 are chosen so that it alone provides a rigid mechanical connection between the center sections 26B and 27B and the horizontal strip 20.

The lead frame 100 is then bent about the bending lines A, B, C, D and E so as to impart to the sections of the strips 26 and 27 the required configuration for the leads 5 and 6 (including the formation of a cavity intended to receive the support mass 14). The bending lines are shown in FIG. 3. The bending of the strips 26 and 27 is also applied to the T-shape strip 28 but, in this example, is not applied to the strips 22 and 23 which therefore define with the horizontal strips 20 and 21 a reference plane.

The calibrated fusible wire 10 is then fixed by brazing, in this case extending over the full width of the strip 26 (or 27). As the sections 26A and 27B are held in their relative position by the strip 28, the transverse distance between the lugs 12 and 13 remains constant, equal to the distance between them in the plane configuration of FIG. 2, whereas their flanks are coplanar as in FIG. 2.

The protective resin 14 is then applied ( in the aforementioned cavity) and, because of its rigidity after polymerization, is able on its own to provide the mechanical fastening together of the sections 26A and 26B (27A and 27B). The sections 26B and 27B may then be separated from the horizontal strip 20 by stamping out areas 29 and 30 (closely spaced hatched areas) covering the upper and lower parts of the branch 28 of which a center part is then separated from the remainder of the lead frame 100.

To facilitate its use the protective resin 14 is advantageously of a type polymerizable by ultra-violet light. It is advantageously a resin of the CHIPBONDER 360 or LID 1043 type.

A capacitor body 4 is prepared and the edge (generally silver-plated) opposite the anode rod 3 advantageously coated with a layer 31 of insulative resin of any appropriate known type to avoid short-circuiting between this edge and the vertical part of the section 6B of the lead 6. As an alternative to this, the insulative resin is applied direct to said vertical part of the section 6B.

The capacitor body 4 is then positioned relative to the sections 6A, 6B and 5; the horizontal part of the section 6A is bonded to the body 4, in practice with silver-containing adhesive 32, and the lead 5 is welded to the tantalum wire 3.

Finally, the assembly comprising the capacitor body plus leads 6A, 6B, 5 is placed between the sections of a mold using the strips 20 through 23 to position it. The resin 7 is injected and after it polymerizes (in practice by raising its temperature) the capacitor is removed from the mold.

The molding operation is carried out for each pair of strips 26/27 delimited by cutting in the plate 100.

It only remains to cut the areas where the leads 6 and 5 join the strips 20 and 21. The capacitor 1 with integral fuse 10 is then ready for use.

It goes without saying that the preceding description has been given by way of non-limiting example only and that numerous variations may be proposed without departing from the scope of the invention. For example, the fusible member could be provided in the positive lead, and it could be placed at the end of the capacitor body rather than to one side thereof.

What is claimed is:

1. Solid electrolyte capacitor comprising a capacitor body having two electrodes, two connecting leads provide output terminals each connected to a respective electrode, a fusible member of predetermined length connected in series between said capacitor body and a preselected output terminal, wherein the connecting lead providing said preselected output terminal includes a first section fixed to one of said electrodes and a second section electrically insulated and mechanically separate from said first section and said capacitor body to form said preselected output terminal, and said fusible member alone establishes an electrical connection between said first section and said second section and is embedded in a rigid thermally insulative support mass of resin and extending between said first section and said second section so as to alone couple them together mechanically in fixed spaced relationship.

2. Capacitor according to claim 1 wherein said first section and said second section comprise two parallel coplanar lugs electrically connected by said fusible member and mechanically connected and spaced by said resin mass.

3. Capacitor according to claim 2 wherein each section has a lateral flank, coplanar with a flank of the other section, and said parallel lugs are each located on one of said lateral flanks and are laterally offset relative to each other.

4. Capacitor according to claim 2, wherein said coplanar lugs are perpendicular to portions of each section with which they form a cavity at least part of which is filled by said mass.

5. Capacitor according to claim 2, wherein said fusible member is a wire of calibrated cross-section extending transversely between said lugs.

6. Capacitor according to claim 1, wherein said mass is made from a resin that will not burn at the temperature at which said fusible member melts.

7. Capacitor according to claim 1, wherein said mass is made from a resin polymerized using ultra-violet light.

8. Capacitor according to claim 1, wherein said capacitor body comprises a porous tantalum core.

9. Capacitor according to claim 1 wherein said capacitor body is embedded in an electrically insulative block of resin, and said second section of said preselected output terminal projects from said block.

10. Method of manufacturing a solid electrolyte capacitor with incorporated fusible member, in which method:
   a capacitor body equipped with electrodes is made;
   a plate is cut out to produce at least one discontinuous strip connected to a reference frame and including two end sections attached to said reference frame and a center section connected to said reference frame by a continuous joining strip;
   the sections of said discontinuous strip are bent along transverse bending lines to their final shape;
   before or after the aforementioned bending, a fusible member is fixed between said center section and one of said end sections and embedded in a rigid, thermally insulative support mass of resin extending between said sections so as to couple them together mechanically and form a first connecting lead:
   said center section is separated from said continuous joining strip and it and the other end section forming a second connecting lead are fixed to respective electrodes of said capacitor body;
   said capacitor body and said connecting leads are overmolded with electrically insulative resin; and
   said leads are separated from said reference frame.

11. Method according to claim 10, wherein two identical continuous strips are delimited by cutting in each reference frame and each comprises a center section connected to said reference frame by a common continuous joining strip.

12. Method according to claim 10, wherein said mass is formed by exposing to ultra-violet light a resin polymerizable by ultra-violet light.

* * * * *